United States Patent

[11] 3,566,909

[72] Inventor Domer Scaramucci
 Oklahoma City, Okla.
[21] Appl. No. 518,244
[22] Filed Jan. 3, 1966
[45] Patented Mar. 2, 1971
[73] Assignee Balon Corporation
 Oklahoma City, Okla.

[54] BETWEEN FLANGE BALL VALVES WITH FIXED-UNSTRESSED SEALS
 4 Claims, 5 Drawing Figs.
[52] U.S. Cl. ................................................ 137/315,
 251/317, 251/363, 251/367
[51] Int. Cl. ........................................... F16k 43/00
 F16k 51/00
[50] Field of Search .................................. 137/315,
 316, 329, 329.01; 251/314, 315, 316, 317, 359,
 360, 361, 363, 365, 366, 367, 148

[56] References Cited
UNITED STATES PATENTS

| | | | | |
|---|---|---|---|---|
| 3,193,248 | 7/1965 | Lowrey | | 251/315 |
| 3,390,861 | 7/1968 | Masheder | | 251/315X |
| 2,895,496 | 7/1959 | Sanctuary | | 137/315 |
| 3,157,380 | 11/1964 | Sivyer | | 251/315X |

*Primary Examiner*—Alan Cohan
*Assistant Examiner*—David R. Matthews
*Attorney*—Dunlap, Laney, Hessin & Dougherty ABSTRACT: A ball valve having both upstream and downstream seals and constructed for use between pipe flanges. The valve ball has a diameter, measured along the port therethrough, greater than the valve body and the seals are carried by seat members extending between the end of the body and the flanges to provide compressive loading on the body when the flanges are bolted into operating position.

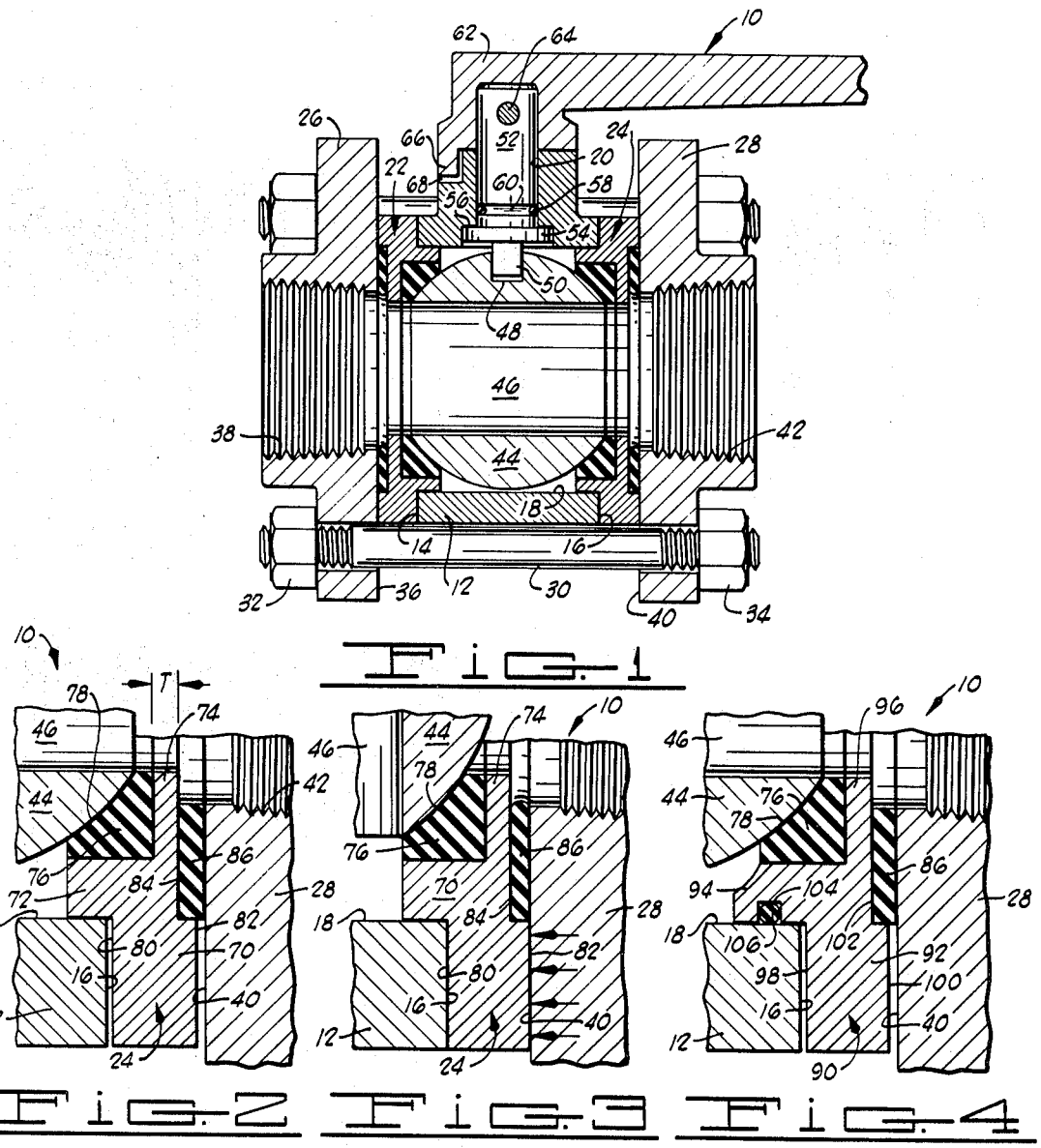

BETWEEN FLANGE BALL VALVES WITH FIXED-UNSTRESSED SEALS

This invention relates generally to improved valves. More particularly, but not by way of limitation, this invention relates to an improved between-flange ball valve and seat-seal structures therefor.

Manifestly, it is highly desirable in the construction of valves to provide the maximum flow area through the valve while maintaining the valve size, both in length and diameter, to a minimum. In the manufacturing of ball valves for use between flanged connecting members that have the foregoing desirable features, several problems have arisen.

In addition to the flanged connecting members, the valves include: a valve ball, a valve body, and some form of seal members. The seal members are provided to engage the valve member and, thereby prevent fluid flow through the valve when the valve is in the closed position. Normally, the seal members are in the form of annular members that are often constructed from a resilient material suitable for sealingly engaging the valve ball. Frequently, annular reinforcing members are provided to support the seals. The reinforcing members are usually constructed from a rigid material to prevent extrusion of the resilient seal members from the valve when pressure is imposed thereon.

In most between flange ball valves previously constructed, the difficulty of structurally locating the seals, reinforcing members, etc. within the valve has resulted in a valve of excessive length. The excessive length adds cost and weight resulting in a valve that is too expensive and too heavy to be competitive.

Some attempts have been made to incorporate the annular seal members and the reinforcing members directly in the valve body. These valves are generally expensive to construct since a large amount of machining must be done directly on the valve body. Also, some means must be provided for introducing the relatively large valve ball into the bore formed in the valve body when the seal members are incorporated as an integral portion thereof. Generally, the valve body is split or an opening provided in a sidewall thereof through which the valve ball can be introduced. Manifestly, such construction introduces additional sealing and manufacturing problems.

Other attempts have been made to construct annular seat-seal members that are installed between the valve body and the flanged connecting members. This type of construction has not proved to be entirely satisfactory due to the forces exerted thereon when the threaded fasteners connecting the flanged connecting members are tightened. Such forces usually result in the deformation of the reinforcing members to such an extent that the seals are ineffective or to the extent that the torque required to rotate the valve ball in the valve body is excessive.

This invention provides an improved ball valve for use between flanged connecting members, the ball valve comprising: a valve body having an upstream end face, a downstream end face, and a bore extending therethrough intersecting the end faces; a valve ball disposed in the bore, the ball having a port extending therethrough and rotatable between an open position wherein the port and bore are aligned and a closed position wherein the port and bore are disaligned; operating means in the valve operably connected with the ball for rotating the ball between the open and closed positions; and, an annular seat-seal member having a first surface arranged to sealingly engage the valve ball and a second surface arranged to sealingly engage one of the flanged connecting members; an annular portion of the seat-seal member being disposed between one of the end faces on the valve body and one of the flanged connecting members, whereby the force imposed on the annular seat-seal member by the flanged connecting member upon assembly of the valve is carried by the valve body through the seat-seal member as a compressive force, thereby avoiding distortion of the seat-seal member.

One object of the invention is to provide an improved ball valve for use between flanged connecting members that has a maximum flow area to valve size.

Another object of the invention is to provide an improved ball valve for use between flanged connecting members that provides an effective fluidtight closure of the valve by reinforced seat-seal members.

One other object of the invention is to provide an improved ball valve for use between flanged connecting members that can be easily and economically manufactured.

A further object of the invention is to provide an improved ball valve for use between flanged connecting members that provides an effective fluidtight closure of the valve without exerting undue force on the valve ball.

Still another object of the invention is to provide an improved ball valve for use between flanged connecting members that provides an effective fluidtight seal with the valve ball and with the flanged connecting members.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a ball valve constructed in accordance with the invention;

FIG. 2 is an enlarged, fragmentary cross-sectional view illustrating a portion of the ball valve of FIG. 1;

FIG. 3 is an enlarged, fragmentary cross-sectional view similar to FIG. 2, but showing the valve in the assembled position with the valve ball rotated to the closed position;

FIG. 4 is an enlarged, fragmentary cross-sectional view similar to FIG. 2, but illustrating another embodiment of seat-seal member that can be utilized in the ball valve of FIG. 1; and, FIG. 5 is a fragmentary cross-sectional view of another embodiment of ball valve also constructed in accordance with the invention.

EMBODIMENT OF FIG. 1

FIG. 1 illustrates the structure of a ball valve generally designated by the reference character 10 and constructed in accordance with the invention. As illustrated therein, the ball valve 10 includes a valve body 12 having an upstream end face 14, a downstream end face 16 and a bore 18 extending therethrough intersecting the end faces. It is to be noted that the bore 18 is of constant diameter, thereby reducing the machining performed on the valve body 12 to the minimum.

An opening 20 extends transversely through the valve body 12 intersecting the bore 18. The purpose of the transverse opening 20 will become apparent as the description proceeds.

An annular upstream seat-seal member 22 is disposed adjacent the end face 14 of the valve body 12 and an annular downstream seat-seal 24 is disposed adjacent the downstream end face 16 of the valve body 12. The upstream and downstream seat-seals 22 and 24 will be described in detail hereinafter.

A flanged upstream connecting member 26 is disposed adjacent the annular upstream seat-seal 22 and a flanged downstream connecting member 28 is disposed adjacent the downstream seat-seal 24. Threaded fasteners 30 extend between the flanged connecting members 26 and 28 to hold the ball valve 10, that is, the flanged connecting members 26 and 28, the upstream and downstream seat-seals 22 and 24, and the valve body 12 assembled. As clearly shown in FIG. 1, threaded nuts 32 and 34 are disposed on the threaded fasteners 30 in engagement with the upstream connecting member 26 and the downstream connecting member 28, respectively, to securely retain the ball valve 10 assembled.

The upstream connecting member 26 includes an end face 36 and a partially threaded opening 38 that extends therethrough intersecting the end face 36. The opening 38 is axially aligned with the bore 18 in the valve body 12 when the upstream connecting member 26 is assembled therewith.

The downstream connecting member 28 includes an end face 40 and a partially threaded opening 42 that extends therethrough intersecting the end face 40. The opening 42 is also axially aligned with the bore 18 of the valve body 12 when the downstream connecting member 28 is assembled with the valve body 12.

A valve ball 44 is disposed in the bore 18 and has a port 46 extending therethrough. It will be noted in FIG. 1, that the ball 44 is larger, with respect to the valve body, than is normally employed, with the diameter of the ball, measured along the port 46, being greater than the length of the body 12. A rectangular recess 48 is formed in the exterior of the valve ball 44 and is sized to receive a rectangular end 50 on a valve operating member 52. As will be understood by those skilled in the art, the rectangular recess 48 has a length greater than the length of the rectangular end 50 so that the valve ball 44, when in the closed position, that is, when the port 46 is disaligned with the bore 18, can move relatively along the bore 18.

The valve operating member 52 also includes an exterior flange 54 that is in engagement with a downwardly facing shoulder 56 formed in the valve body 12. The engagement between the flange 54 and the shoulder 56 limits the upward movement of the valve operating member 52 relative to the valve body 12.

An O-ring seal 58 is disposed in an annular recess 60 formed in the valve operating member 52 forming a fluidtight seal between the valve operating member 52 and the valve body 12 in the opening 20.

A valve operating handle 62 is connected by a pin 64 with the upper end of the valve operating member 52. The handle 62 includes a lug portion 66 that is engageable with a pair of abutments 68 (only abutment 68 is shown in FIG. 1) that are formed on the valve body 12. The engagement of the lug portion 66 with the abutments 68 limits the rotational movement of the handle 62, the valve operating member 52 and the interconnected valve ball 44 to approximately 90°.

The structure of the downstream seat-seal 24 is more clearly shown in the enlarged, fragmentary cross-sectional views of FIGS. 2 and 3. The seat-seals 22 and 24 are identical in construction though oppositely disposed in the ball valve 10 and for this reason, only the structure of the downstream seat-seal 24 will be described in detail. It will be understood that similar portions of the upstream seat-seal 22 will be designated by the same reference characters used in describing the downstream seat-seal 24.

As illustrated in FIG. 2, which shows the various parts in their relaxed condition, the seat-seal 24 includes a relatively rigid annular reinforcing member 70 having an axial flange portion 72 and a radially inwardly extending flange portion 74 formed thereon. The axial flange portion 72 has an outside diameter sized to fit closely within the bore 18 in the valve body 12. The flange portion 74 has a thickness T that is preferably held to the minimum thickness sufficient to support an annular seal member 76 carried by the reinforcing member 70. Maintaining the minimum thickness T permits a substantial reduction in the overall length of the valve 10.

The seal member 76, as previously mentioned, is disposed in the reinforcing member 70 and has a surface 78 thereon configured to sealingly engage the exterior surface of the valve ball 44. As shown in FIGS. 1 and 2, the seal member 76 extends out of the respective end of the valve body 12 in order to sealingly engage the ball 44 around the respective end of the port 46 when the valve is open, such that the ball 44 may be of the maximum diameter with respect to the length of the valve body. The seal member 76 is preferably constructed from a resilient material, such as natural or synthetic rubber or from one of the synthetic resins.

An end surface 80 on the reinforcing member 70 is defined by the axial flange 72 and the outside diameter of the reinforcing member 70. In the preferred form of the invention and as illustrated in FIG. 2, the end surface 80 has an area equal to the end face 16 of the valve body 12.

The reinforcing member 70 also includes an end face 82 that is arranged to engage the end face 40 on the downstream connecting member 28. A recess 84 formed in the end face 82 of the reinforcing member 70 has an outside diameter substantially equal to the diameter of the bore 18 and is provided to receive a resilient annular seal member 86.

As clearly shown in FIG. 2, the seal member 86 has a thickness greater than the depth of the recess 84 and is disposed in the recess 84 between the reinforcing member 70 and the end face 40 on the downstream connecting member 28. Preferably, the seal member 86 has an inside diameter that is substantially equal to the diameter of the opening 42 extending through the downstream connecting member 28. However, the inner diameter of the seal member 86 may be equal to but not less than the inner diameter of the reinforcing member 70.

The fragmentary cross-sectional view of FIG. 3 illustrates the arrangement of the components of the valve 10 when the nuts 32 and 34 are tightened on the threaded fasteners 30. As shown therein, the surface 80 on the reinforcing member 70 tightly and sealingly engages the end face 16 of the valve body 12. The end face 40 on the downstream connecting member 28 is in engagement with the end face 82 of the reinforcing member 70 deforming the seal member 86 into tight sealing engagement with the reinforcing member 70. It will be noted, that the small amount of deformation of the seal member 86 is sufficient to form a fluidtight seal between the seat-seal 24 and the flanged connecting member 28, but does not exert a force thereon sufficient to distort or deform the flange portion 74 of the reinforcing member 70.

As also illustrated in FIG. 3, the valve ball 44 has been rotated to the closed position, that is, to the position wherein the port 46 extending therethrough is disaligned with the bore 18. The valve ball 44 moves toward the seal member 76 to the extent allowed by the compression or deformation of the seal member 76. Thus, it can be seen that a fluidtight downstream seal is formed in the ball valve 10 between the exterior surface of the valve ball 44 and the surface 78 on the seal member 76, between the end face 16 of the valve body 12 and the surface 80 on the reinforcing member 70, and between the reinforcing member 70 and the downstream connecting member 28 by the deformation of the seal member 86.

It can also be seen by comparing FIGS. 2 and 3 that the force exerted on the valve ball 44 by the seal member 76 is limited due to the engagement of the surface 80 on the seat-seal 24 with the end face 16 of the valve body 12. Furthermore, the seal between the valve ball 44 and the seal member 76 remains effective since the deformation of the seal member 86 does not exert sufficient force on the flange portion 74 of the reinforcing member 70 to deform the seat-seal 24. Avoiding deformation of the flange portion 74 eliminates any possibility of binding the valve ball 44 thereby permitting the valve ball 44 to be rotated easily in all operating positions thereof.

As may also be seen in FIGS. 1 and 3, the force exerted by the assembly of the flanged connecting members 26 and 28 with the valve body 12 is carried by the valve body 12 as a pure compression load through the seat-seal members 22 and 24. More specifically, the arrows illustrated in FIG. 3 shown the imposition of the load from the end face 40 of the downstream connecting member 28 on the end face 82 of the reinforcing member 70. It will be apparent therein that such load is transferred directly by the surface 80 on the reinforcing member 70 to the end face 16 of the valve body 12. Thus, all of the load exerted by the flanged threaded fasteners 30 on the valve 10 is carried by the valve body 12 with the exception of the small force resulting from deformation of the seal member 86.

EMBODIMENT OF FIG. 4

The enlarged, fragmentary cross-sectional view of FIG. 4 illustrates another embodiment of annular seat-seal member generally designated by the reference character 90 and also constructed in accordance with the invention. The seat-seal 90 is illustrated as being positioned in the ball valve 10.

The seat-seal member 90 includes a reinforcing member 92 having an axial flange portion 94 and a radially, inwardly extending flange portion 96. An end face 98, defined by the axial flange 94, is arranged to engage the end face 16 on the valve body 12 in a manner similar to the engagement between the surface 80 of the seat-seal 24 and the end face 16 of the valve body 12.

The reinforcing member 92 also includes a surface 100 disposed adjacent the end face 40 of the downstream connecting member 28. An annular recess 102 is formed in the surface 100 and has an outside diameter substantially equal to the diameter of the bore 18 in the valve body 12. The recess 102 is provided to receive the seal member 86. The recess 102 is not as deep as the thickness of the seal member 86 so that the seal member 86 is deformed when the downstream connecting member 28 is tightly assembled with the valve body 12.

The annular seat-seal 90 also includes the annular seal member 76. The seal member 76 is positioned in the reinforcing member 92 so that the surface 78 thereon sealingly engages the valve ball 44.

An annular groove 104 is formed in the outer periphery of the axial flange 94 adjacent the valve body 12 in the bore 18. An O-ring seal 106 is located in the groove 104 and sealingly engages the axial flange 94 and the valve body 12 in the bore 18. The provision of the O-ring seal 106 eliminates the necessity for forming a fluidtight seal between the end face 16 of the valve body 12 and the end face 98 on the seat-seal member 90.

As will be readily apparent from viewing FIG. 4, the ball valve 10 with the seat-seal member 90 located therein operates in precisely the same manner as the ball valve 10 with the seat-seals 22 and 24 located therein. Also, it will be evident that the same advantages exist when the valve 10 is provided with the seat-seal member 90.

EMBODIMENT OF FIG. 5

The fragmentary view of FIG. 5 illustrates the structure of a ball valve generally designated by the reference character 10a and also constructed in accordance with the invention. The ball valve 10a includes a valve body 110 having an end face 112 that is in engagement with the end face 36 on the upstream connecting member 26 and an end face 114 that is in engagement with the surface 80 of the downstream seat-seal member 24.

As previously described in connection with the embodiment of FIG. 1, the end face 40 of the downstream connecting member 28 is in engagement with the end face 82 of the seat-seal member 24. The threaded fasteners 30 extend through the flanged connecting member 26 and 28 and are provided with the nuts 32 and 34, as previously described to hold the valve 10a assembled.

A bore 116 extends through the valve body 110 intersecting the end faces 112 and 114. A counterbore 118 is formed in the bore 116 forming an inwardly projecting flange portion 120 in the valve body 110. A second counterbore 122 is formed in the valve body 110 to enlarge the bore 116 to a size sufficient to receive the valve ball 44.

An annular resilient seal member 124 is positioned in the counterbore 118 and has a surface 126 thereon configured to sealingly engage the exterior of the valve ball 44. An annular seal member 128 is positioned in an annular recess 130 formed in the end face 112 of the valve body 110 and is arranged to sealingly engage the end face 36 of the upstream connecting member 26 and the flange portion 120 on the valve body 110.

It will be understood that the ball valve 10a includes the necessary operating components (not illustrated) as previously described in connection with the ball valve 10.

It will also be evident from viewing FIG. 5 that the operation of the ball valve 10a is identical to the operation of the ball valve 10.

While the ball valve 10a is somewhat more difficult to construct due to the machining necessary to form the valve body 110, it is important to note that the load imposed on the ball valve 10a by the flanged connecting members 26 and 28 is transmitted through the valve body 110 as a pure compressive load as previously described in connection with the ball valve 10. Also, the ball valve 10a may be quickly and easily assembled since the downstream seat-seal member 24 can be positioned in the valve body 110 after the valve ball 44 and the seal member 124 have been inserted therein.

From the foregoing detailed descriptions of the various embodiments, it can be seen that a ball valve constructed in accordance with the invention provides a structure including effective sealing members that are adequately reinforced without the usual excessive overall length of the valve. Also, the structure described provides for the direct transferrance of the forces exerted by the flanged connecting members to the valve body, thus avoiding deformation of the reinforcing member and/or seals and the consequent loss of effective sealing or binding of the valve ball that would otherwise occur.

It will be understood that the embodiments described hereinbefore are presented by way of example only and that many changes and modifications can be made thereto without departing from the spirit of the invention or from the scope of the annexed claims.

I claim:
1. A ball valve comprising:
    a valve body having an upstream end face, a downstream end face, and a bore extending therethrough intersecting said end faces;
    a valve ball disposed in said bore, said ball having a port extending therethrough and rotatable between an open position wherein said port and bore are aligned to a closed position wherein said port and bore are disaligned, the diameter of said ball measured along said port, being greater than the length of said body;
    operating means in said valve operably connected with said ball for rotating said ball between said open and closed positions;
    a pair of flanged connecting members, each having an end face thereon and an opening extending therethrough intersecting said end face, the end faces being disposed relatively adjacent the end faces on said valve body with said openings aligned with said bore;
    an annular seat-seal member at each end of the valve body, each having an axial flange portion extending into said bore and carrying a first seal on one side thereof extending partially in and partially out of the respective end of the valve body and arranged to sealingly engage said valve ball, a second seal on the opposite side thereof sealingly engaging a respective end face on one of said connecting members and having an outer diameter substantially equal to the diameter of said bore, said annular seat seal member having an annular portion extending outwardly and disposed between and in engagement with one of the end faces on said valve body and the end face on one of said connecting members; and,
    connecting means extending between the flanges on said connecting members for assembling said valve, said connecting means exerting a force on said connecting members that is carried as a compressive load by said valve body through the annular portion of said seat-seal members, thereby avoiding distortion of said seat-seal members.

2. The ball valve of claim 1 wherein each of said seat-seal members includes an axial flange portion having an outside diameter sized to fit within said bore to align said seat-seal member with said valve body.

3. The ball valve of claim 2 and also including:
    an annular groove in said axial flange adjacent said valve body in said bore; and
    an annular seal in said groove in sealing engagement with said seat-seal member and said valve body.

4. The ball valve of claim 2 wherein each said seat-seal member includes:
- a first annular recess in said seat-seal member adjacent said valve ball;
- a first resilient annular seal member disposed in said first annular recess and having a surface thereon in sealing engagement with said valve member;
- a second annular recess in said seat-seal member disposed adjacent one of the connecting members and having an outside diameter substantially equal to the diameter of said bore; and
- a second resilient annular seal member disposed in said second annular recess sealingly engaging one of the flanged connecting members.